United States Patent
Kim et al.

(10) Patent No.: US 11,068,021 B2
(45) Date of Patent: Jul. 20, 2021

(54) TIMING CONTROLLER BASED ON HEAP SORTING, MODEM CHIP INCLUDING THE SAME, AND INTEGRATED CIRCUIT INCLUDING THE TIMING CONTROLLER

(71) Applicant: SAMSUNG ELECTRONICS CO., LTD., Suwon-si (KR)

(72) Inventors: Kyung-Min Kim, Hwaseong-si (KR); Won-Seok Jeong, Suwon-si (KR); Il-Muk Choi, Suwon-si (KR); Jun-Ho Lee, Seoul (KR); Sung-Chul Han, Yongin-si (KR); Ki-Joon Hong, Hwaseong-si (KR); Seung-Joong Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 71 days.

(21) Appl. No.: 16/231,684

(22) Filed: Dec. 24, 2018

(65) Prior Publication Data
US 2019/0196533 A1    Jun. 27, 2019

(30) Foreign Application Priority Data

Dec. 26, 2017   (KR) .................. 10-2017-0180039
Oct. 10, 2018   (KR) .................. 10-2018-0120607

(51) Int. Cl.
  *G06F 1/14*   (2006.01)
  *G06F 3/06*   (2006.01)
  *G06F 9/00*   (2006.01)

(52) U.S. Cl.
  CPC ............. *G06F 1/14* (2013.01); *G06F 3/0611* (2013.01); *G06F 3/0679* (2013.01); *G06F 9/00* (2013.01)

(58) Field of Classification Search
  CPC . G06F 1/14; G06F 3/0611; G06F 9/00; G06F 9/3814; G06F 9/3836;
  (Continued)

(56) References Cited

U.S. PATENT DOCUMENTS 6,469,983 B2 * 10/2002 Narayana ................ H04L 47/10
                                                        370/231
7,188,053 B2     3/2007 Nikitin et al.
(Continued)

FOREIGN PATENT DOCUMENTS

CN          1930792       3/2007

OTHER PUBLICATIONS

First Office Action dated March 15, 2021 in Corresponding CN Patent Application No. 201811601965.0.

*Primary Examiner* — William B Partridge
*Assistant Examiner* — Kasim Alli
(74) *Attorney, Agent, or Firm* — F. Chau & Associates, LLC

(57) ABSTRACT

A modem chip includes a processor configured to generate instructions, a timing controller configured to respectively generate control signals corresponding to the instructions at the execution times of the instructions, and a plurality of intellectual property blocks, each configured to operate in response to a corresponding control signal of the control signals. The timing controller includes a heap sorting circuit configured to sort the instructions according to execution orders of the instructions based on heap sorting using the execution times, a reference counter configured to generate a reference time, and a signal generator configured to generate a control signal corresponding to a current instruction when the reference time matches the execution time of the current instruction having a highest execution order among the instructions.

20 Claims, 17 Drawing Sheets

(58) Field of Classification Search
CPC ........ G06F 9/3855; G06F 9/4881; G06F 7/24;
G06F 7/78; H04L 69/169
See application file for complete search history.

(56) References Cited

U.S. PATENT DOCUMENTS

| | | | |
|---|---|---|---|
| 7,657,525 | B2 | 2/2010 | Nadj et al. |
| 7,765,216 | B2 | 7/2010 | Li et al. |
| 8,095,491 | B1 | 1/2012 | Dillon |
| 8,230,070 | B2 | 7/2012 | Buyya et al. |
| 8,656,206 | B2 | 2/2014 | Gasanov et al. |
| 8,817,937 | B2 | 8/2014 | Greenspan |
| 2007/0165560 | A1* | 7/2007 | Bini ............... H04B 7/2687 370/328 |
| 2010/0269123 | A1* | 10/2010 | Mejdrich ............ H04L 43/0817 719/318 |
| 2012/0087443 | A1* | 4/2012 | Olsson ................ H04B 1/40 375/316 |
| 2014/0181126 | A1* | 6/2014 | Nadj ..................... G06F 7/24 707/753 |
| 2015/0309846 | A1* | 10/2015 | Prasad ................. G06F 9/522 345/522 |
| 2017/0052895 | A1 | 2/2017 | Yang et al. |

\* cited by examiner

FIG. 6A

| IS | ET | ID |
|----|-----|-----|
| IS1 | 20 | ID1 |
| IS2 | 50 | ID2 |
| IS3 | 100 | ID3 |
| IS4 | 200 | ID2 |
| IS5 | 25 | ID6 |

IS5 | 25 | ID6 ← New Received Instruction

FIG. 7A

| IS | ET | ID |
|----|-----|-----|
| IS1 | 20 | ID1 |
| IS2 | 50 | ID2 |
| IS3 | 100 | ID3 |
| IS4 | 200 | ID2 |
| IS5 | 25 | ID6 |
| IS6 | 250 | ID5 |
| IS7 | 10 | ID3 |

IS7, 10, ID3 ← New Received Instruction

TIMING CONTROLLER BASED ON HEAP SORTING, MODEM CHIP INCLUDING THE SAME, AND INTEGRATED CIRCUIT INCLUDING THE TIMING CONTROLLER

CROSS-REFERENCE TO RELATED APPLICATIONS

This application claims priority under 35 U.S.C. § 119 to Korean Patent Application No. 10-2017-0180039 filed on Dec. 26, 2017, and Korean Patent Application No. 10-2018-0120607 filed on Oct. 10, 2018, the disclosures of which are incorporated by reference herein in their entireties.

TECHNICAL FIELD

Exemplary embodiments of the inventive concept relate to a semiconductor integrated circuit, and more particularly, to a real-time timing controller based on heap sorting, a modem chip including the same, and an integrated circuit including the real-time timing controller.

DISCUSSION OF THE RELATED ART

Digital chipsets such as modem chips include a timing controller that controls pieces of internal hardware at an accurate time.

Although a timing controller operating based on a time difference (e.g., a delta time) between events occurring in the pieces of internal hardware may have a simple circuit configuration, a processor (e.g., a central processing unit (CPU)) that provides instructions to the timing controller typically has a complicated circuit configuration that collects and sorts the events, generates instructions corresponding to the events, and sequentially provides the generated instructions to the timing controller according to execution orders. Due to the complicated circuit configuration of the processor, the working load and power consumption of the processor are large.

Alternatively, a timing controller operating based on an absolute time of each event (as opposed to a delta time) stores instructions in an internal register thereof, and an execution time of each of the instructions is compared with a reference time, thereby causing an increase in the circuit complexity and occupied area of the timing controller.

SUMMARY

Exemplary embodiments of the present inventive concept provide a timing controller, a modem chip including the same, and an integrated circuit including the timing controller, whereby a working load of a processor is reduced and the complexity of hardware is decreased.

According to an exemplary embodiment of the present inventive concept, a modem chip includes a processor configured to generate instructions including different execution times, a timing controller configured to receive the instructions and respectively generate control signals corresponding to the instructions at the execution times of the instructions, and a plurality of intellectual property (IP) blocks, each configured to operate in response to a corresponding control signal of the control signals. The timing controller includes a heap sorting circuit configured to sort the instructions according to execution orders of the instructions based on heap sorting using the execution times, a reference counter configured to generate a reference time by counting a clock signal, and a signal generator configured to compare the reference time with an execution time of a current instruction having a highest execution order among the instructions, and generate a control signal corresponding to the current instruction when the reference time matches the execution time of the current instruction.

According to an exemplary embodiment of the present inventive concept, an integrated circuit includes a processor, a timing controller including a heap sorting circuit, and a plurality of function blocks. The processor is configured to output a plurality of instructions at different times, each instruction including an execution time. The heap sorting circuit is configured to sort the plurality of instructions received from the processor at different times in an order from an earliest execution time to a latest execution time. When a reference time reaches an execution time of an instruction having an earliest execution time among the plurality of instructions, the timing controller is configured to generate at least one control signal corresponding to the instruction. Each of the plurality of function blocks is configured to operate in response to a corresponding control signal of the control signals generated by the timing controller.

According to an exemplary embodiment of the present inventive concept, a timing controller includes an interface circuit, an instruction buffer, a heap sorting circuit, a reference counter, and a signal generator. The interface circuit is configured to sequentially receive a plurality of instructions from a processor, each instruction including an execution time. The instruction buffer is configured to store one or more instructions having a relatively early execution time of the plurality of instructions. The heap sorting circuit is configured to sort instructions except the one or more instructions of the plurality of instructions according to execution orders based on heap sorting using the execution time, and store the sorted instructions in a storage area. The reference counter is configured to generate a reference time by counting a clock signal. The signal generator is configured to receive an instruction having an earliest execution time of the one or more instructions as a current instruction from the instruction buffer, and when the reference time reaches an execution time of the current instruction, generate a control signal representing an operation time of a function block corresponding to the current instruction.

BRIEF DESCRIPTION OF THE DRAWINGS

The above and other features of the present inventive concept will become more apparent by describing in detail exemplary embodiments thereof with reference to the accompanying drawings, in which:

FIGS. 6A and 6B are diagrams for describing a heap sorting method according to an exemplary embodiment of the present inventive concept.

FIGS. 7A and 7B are diagrams for describing a heap sorting method according to an exemplary embodiment of the present inventive concept.

DETAILED DESCRIPTION OF THE EXEMPLARY EMBODIMENTS

Figure 1:
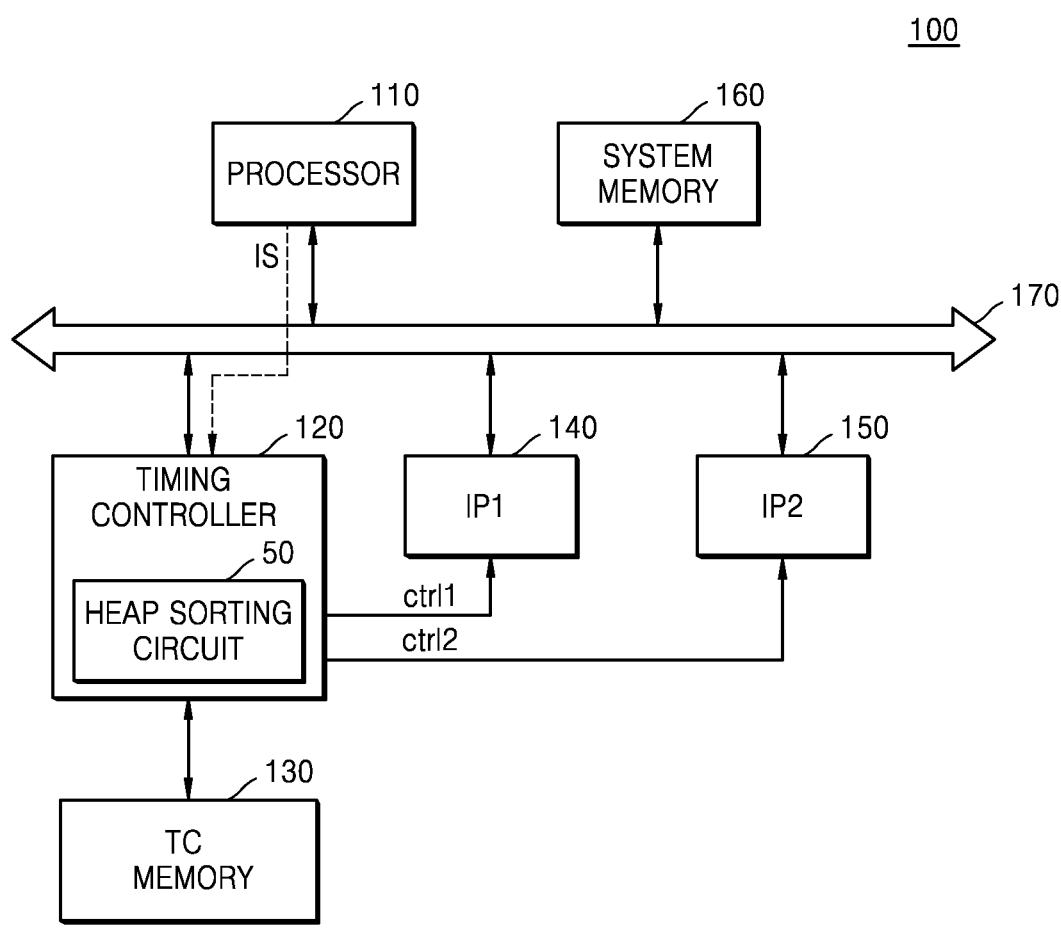
FIG. 1 is a block diagram illustrating an integrated circuit according to an exemplary embodiment of the present inventive concept.

Exemplary embodiments of the present inventive concept will be described more fully hereinafter with reference to the accompanying drawings. Like reference numerals may refer to like elements throughout the accompanying drawings.

It should be understood that descriptions of features or aspects within each exemplary embodiment should typically be considered as available for other similar features or aspects in other exemplary embodiments, unless the context clearly indicates otherwise.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

It will be understood that when a component is referred to as being "connected to" (e.g., electrically connected to) another component, it can be directly connected to the other component, or intervening components may be present.

As is traditional in the field of the present inventive concept, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software.

FIG. 1 is a block diagram illustrating an integrated circuit 100 according to an exemplary embodiment of the present inventive concept.

The integrated circuit 100 of FIG. 1 may be implemented, for example, as a digital signal processing system of various types, and may make up the entirety or just a portion of a computing system. As a nonrestrictive example, the integrated circuit 100 may be equipped in electronic devices such as laptop computers, smart televisions (TVs), smartphones, tablet personal computers (PCs), personal digital assistants (PDAs), enterprise digital assistants (EDAs), digital cameras, portable multimedia players (PMPs), portable navigation devices (PNDs), handheld game consoles, mobile Internet devices (MIDs), multimedia devices, wearable computers, Internet of Things (IoT) devices, Internet of Everything (IoE) devices, e-books, etc. In an exemplary embodiment, the integrated circuit 100 may be a modem included in a wireless communication device.

Referring to FIG. 1, the integrated circuit 100 may include a processor 110, a system memory 160, a timing controller (also referred to as a timing controller circuit) 120, a timing control memory 130, and a plurality of intellectual property (IP) blocks. For example, the integrated circuit may include a first IP block (IP1) 140 and a second IP block (IP2) 150. The elements (for example, the processor 110, the system memory 160, the timing controller 120, the timing control memory 130, and the plurality of IP blocks) of the integrated circuit 100 may transmit or receive data through a bus 170. In FIG. 1, the integrated circuit 100 is illustrated as including two IP blocks (e.g., the first IP block (IP1) 140 and the second IP block (IP2) 150), however, this is for convenience of description and exemplary embodiments are not limited thereto. For example, in exemplary embodiments, the integrated circuit 100 may include three or more IP blocks.

The processor 110 may control an overall operation of the integrated circuit 100 and may be implemented as, for example, a central processing unit (CPU), a microprocessor, a digital signal processor, etc. In an exemplary embodiment, the processor 110 may be implemented as a multi-core processor such as, for example, a dual-core processor or a quad-core processor.

The processor 110 may generate a plurality of instructions IS used to schedule the occurrences of events of the plurality of IP blocks. For example, the first IP block 140 and the second IP block 150 may transmit the plurality of instructions IS to the timing controller 120. The plurality of instructions IS may include a command to generate control signals used to control operations (e.g., operation times) of the first IP block 140 and the second IP block 150. The plurality of instructions IS may be generated and transmitted at different times. In an exemplary embodiment, each of the plurality of instructions IS may include an execution time and an identification (ID). The execution time may represent an absolute time when a corresponding instruction is executed, and the ID may represent a control signal generated based on execution of the corresponding instruction and/or an IP block to which the control signal is transmitted.

In an exemplary embodiment, the processor 110 may transmit instruction data corresponding to each of the plurality of instructions IS to the timing controller 120 through the bus 170. The protocol of the bus 170 may be an advanced microcontroller bus architecture (AMBA) protocol such as, for example, advanced high-performance bus (AHB), advanced peripheral bus (APB), advanced eXtensible interface (AXI), AXI4, or AXI coherency extensions (ACE), and in addition, may use a protocol such as uNetwork, core connect, or open core protocol of OCP-IP. The processor 110 may generate an instruction having a format based on the protocol of the bus 170, and may transmit the generated instruction to the timing controller 120 through the bus 170.

The system memory 160 may operate according to control by the processor 110 and may be used, for example, as a working memory, a buffer memory, a cache memory, etc. For example, the system memory 160 may be implemented as a volatile memory, such as dynamic random access memory (DRAM) or static random access memory (SRAM), or a non-volatile memory such as phase change random access memory (PRAM), magnetic random access memory (MRAM), ferroelectric random access memory (FeRAM), resistive random access memory (ReRAM), or flash memory.

The plurality of IP blocks (e.g., the first IP block 140 and the second IP block 150) may be functional blocks that perform separate functions or various functions associated with one another. For example, when the integrated circuit 100 is implemented as a modem, the first IP block 140 and the second IP block 150 may be hardware blocks that configure a transmission circuit to process transmission data or configure a reception circuit to process reception data.

Each of the plurality of IP blocks may operate at a corresponding time, and the timing controller 120 may schedule operation times of the plurality of IP blocks. The timing controller 120 may receive the plurality of instructions IS from the processor 110 and may execute each of the plurality of instructions IS at a corresponding execution time, thereby generating control signals (for example, a first control signal ctrl1 and a second control signal ctrl2) provided to the plurality of IP blocks. The first IP block 140 may operate at a certain time in response to the first control signal ctrl1, and the second IP block 150 may operate at another certain time in response to the second control signal ctrl2. In an exemplary embodiment, a plurality of control signals may be received by one IP block. In this manner, the timing controller 120 may generate the first control signal ctrl1 and the second control signal ctrl2, which are to be provided to the plurality of IP blocks, based on the plurality of instructions IS received by the timing controller 120. As a result, each of the plurality of IP blocks may be controlled by the timing controller 120 to operate at a certain time.

For example, the timing controller 120 may generate a reference time, and when the reference time reaches an execution time of an instruction having a highest execution order from among the plurality of instructions IS, the timing controller 120 may execute the instruction to generate a control signal. In an exemplary embodiment, a plurality of control signals corresponding to the same IP block or different IP blocks may be generated by executing one instruction.

The plurality of instructions IS may be received at different times, and execution times when the plurality of instructions IS are executed may differ. The orders in which the plurality of instructions IS are received may not match the execution orders of the plurality of instructions IS. For example, an execution time of an early-received instruction IS may be later than an execution time of a late-received instruction IS (wherein the early-received instruction IS is received before the late-received instruction). The timing controller 120 may include a heap sorting circuit 50 that sorts the plurality of instructions IS according to execution orders.

The heap sorting circuit 50 may sort the plurality of instructions IS according to execution orders based on a heap sorting algorithm. The heap sorting circuit 50 may execute the heap sorting algorithm based on the execution time of each of the plurality of instructions IS, and thus, may sequentially sort the plurality of instructions IS from an instruction having a highest execution order to an instruction having a lowest execution order.

The heap sorting circuit 50 may store the sorted plurality of instructions IS in the timing control memory (hereinafter referred to as a memory) 130. In an exemplary embodiment, the memory 130 may be a dedicated memory of the timing controller 120. The memory 130 may store the plurality of instructions IS and may output the sorted plurality of instructions IS to the timing controller 120. For example, the memory 130 may be implemented as a volatile memory such as DRAM or SRAM, but is not limited thereto. In exemplary embodiments, the memory 130 may be implemented as a non-volatile memory such as NAND flash memory, PRAM, ReRAM, or MRAM. In an exemplary embodiment, the heap sorting circuit 50 may store the sorted plurality of instructions IS in an internal storage area.

When a new instruction IS is received, the heap sorting circuit 50 may re-sort the newly received instruction IS and pre-sorted instructions IS in real time. The heap sorting circuit 50 may read instructions IS, which are pre-sorted and stored in the memory 130, from the memory 130, and may perform the heap sorting algorithm on the sorted instructions IS, thereby re-sorting the plurality of instructions IS.

In an integrated circuit equipped with a timing controller according to a comparative example, in which the timing controller controls events occurring in IP blocks based on a time difference (e.g., a delta time) between the events, a processor generates all instructions representing events which are to be performed later, sorts the instructions in a time order, and transmits the sorted instructions to the timing controller. The timing controller according to the comparative example executes one instruction and then executes another instruction after a predetermined delta time, thereby generating control signals. According to an operation of the timing controller according to the comparative example based on the delta time, while instructions previously provided to the timing controller are being executed, another instruction may be difficult to additionally execute. Also, since the timing controller according to the exemplary embodiment operates based on the delta time, when there is no instruction which is to be performed after a last instruction is executed, the timing controller cannot perform any operation. That is, since there is no continuity between events, time recovery is needed. Therefore, the processor collects events as long as possible, and when the collection is completed, the processor sorts instructions corresponding to the events in a time order and provides the sorted instructions to the timing controller before a next period starts (for example, before a next sub-frame starts when the integrated circuit is a modem). Accordingly, a working load and processing power of the processor may be large, causing a reduction in performance of the integrated circuit.

However, in the integrated circuit 100 according to an exemplary embodiment of the present inventive concept, since the timing controller 120 executes the plurality of instructions IS based on an absolute time, the processor 110 may generate instructions IS each including an execution time which is an absolute time. The timing controller 120 may sort the plurality of instructions IS according to an execution time (e.g., an execution order), and thus, since the processor 110 does not sort the instructions IS, a working load and processing power of the processor 110 may be reduced. Also, the timing controller 120 may sort received instructions in real time based on the heap sorting algorithm. As a result, in an exemplary embodiment, the processor 110 does not generate instructions in order based on an execution time, thereby enhancing a degree of availability of the processor 110 to perform other tasks.

Figure 2:
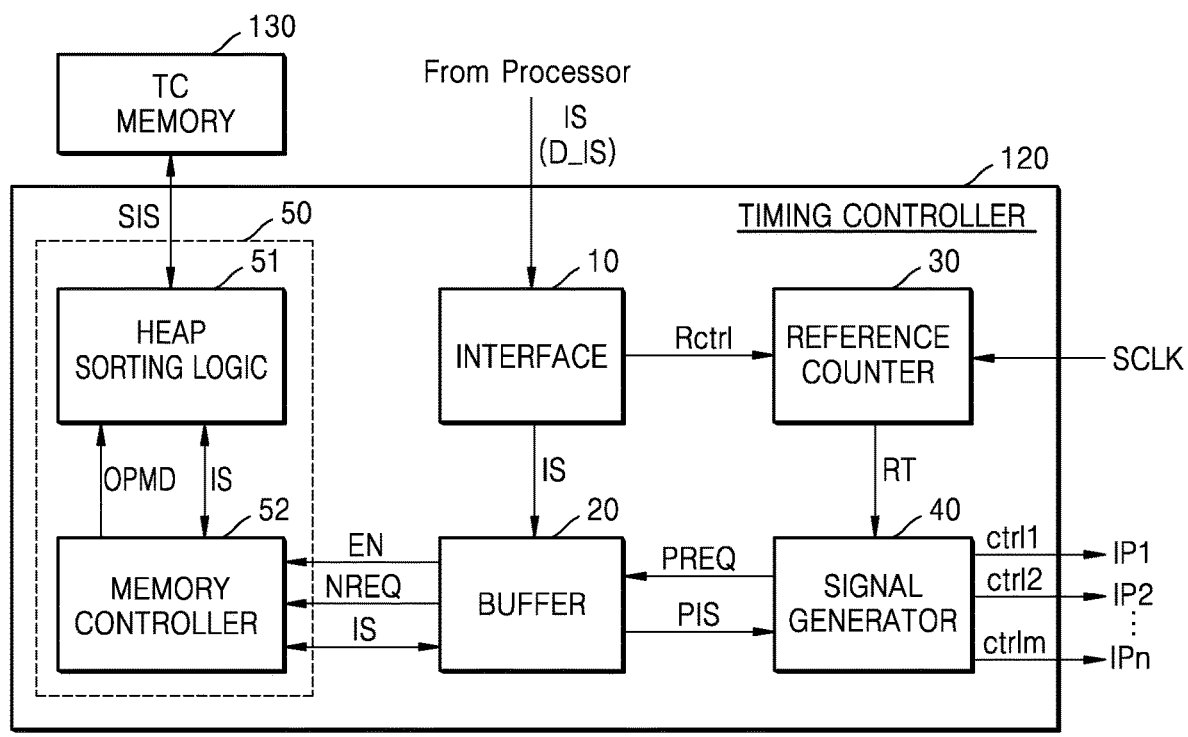
FIG. 2 is a block diagram illustrating a timing controller according to an exemplary embodiment of the present inventive concept.

FIG. 2 is a block diagram illustrating a timing controller 120 according to an exemplary embodiment of the present inventive concept.

Referring to FIG. 2, the timing controller 120 may include an interface 10, a buffer 20, a reference counter (also referred to as a reference counter circuit) 30, a signal generator (also referred to as a signal generator circuit) 40, and a heap sorting circuit 50.

The interface 10 may transmit or receive data to or from a processor (e.g., processor 110 of FIG. 1) through a bus (e.g., bus 170 of FIG. 1). The interface 10 may receive a plurality of instructions IS from the processor 110. The interface 10 may receive an instruction (for example, instruction data D_IS) having a format based on a protocol of the bus 70, and may change a format of the instruction data D_IS, thereby generating an instruction IS based on a data protocol of the timing controller 120.

The timing controller 120 may provide the instruction IS to the buffer 20. The instruction IS may include a command to generate at least one control signal corresponding to one of a plurality of IP blocks IP1 to IPn. As described above with reference to FIG. 1, the instruction IS may include an execution time that represents an absolute time when the instruction IS is executed, and at least one control signal generated by executing the instruction IS and/or an ID representing at least one IP block to which the at least one control signal is transmitted.

In an exemplary embodiment, the instruction data D_IS may include a control instruction that controls the internal elements (for example, the interface 10, the buffer 20, the reference counter 30, the signal generator 40, and the heap sorting circuit 50) of the timing controller 120, and the interface 10 may generate control signals that control the internal elements of the timing controller 120 based on the control instruction. For example, the interface 10 may generate a reference counter control signal Rctrl based on the control instruction corresponding to the reference counter 30, and may provide the reference counter control signal Rctrl to the reference counter 30. The reference counter 30 may change a configuration in response to the reference counter control signal Rctrl.

The reference counter 30 may count a system clock signal SCLK to generate a reference time RT. For example, the reference counter 30 may generate a count value based on the counting of the system clock signal SCLK, and may output the count value as the reference time RT. In an exemplary embodiment, when an integrated circuit (e.g., integrated circuit 100 of FIG. 1) including the timing controller 120 is a modem, the reference counter 30 may count the system clock signal SCLK in a period of a sub-frame, thereby generating the reference time RT at every sub-frame.

In an exemplary embodiment, the reference counter 30 may operate M (where M is an integer equal to or greater than two) times faster than an operation speed of the integrated circuit 100, and may increase the count value at a speed which is M times faster than the operation speed of the integrated circuit 100. For example, when it is assumed that the operation speed of the integrated circuit 100 is 1.28 megachips per second (Mcps) and the reference counter 30 operates eight times faster than the operation speed of the integrated circuit 100, the operation speed of the reference counter 30 is 10.24 megahertz (MHz), and the reference counter 30 increases the count value by one at every 1 second/10.24 MHz.

When the reference time RT reaches an execution time of an instruction (e.g., an instruction (hereinafter referred to as a current instruction) PIS which is to be executed currently) having a highest execution order of the plurality of instructions IS received from the processor 110, the signal generator 40 may generate a control signal corresponding to the current instruction PIS. The generated control signal may be output to a corresponding IP block of the plurality of IP blocks IP1 to IN. In the exemplary embodiment illustrated in FIG. 2, n is an integer greater than or equal to three. However, exemplary embodiments are not limited thereto. For example, in exemplary embodiments, n may be an integer greater than or equal to one.

For example, the signal generator 40 may transmit a current instruction request PREQ to the buffer 20 and may receive the current instruction PIS from the buffer 20. The current instruction PIS may be an instruction IS which is not yet executed and has an earliest execution time of instructions IS (e.g., the plurality of instructions IS received from the processor 110) stored in the buffer 20 and the memory 130.

The signal generator 40 may compare an execution time of the current instruction PIS with the reference time RT. In an exemplary embodiment, the signal generator 40 includes a single comparator used to perform the comparison. When the execution time matches the reference time RT, the signal generator 40 may execute the current instruction PIS to generate a control signal corresponding to the current instruction PIS. For example, the signal generator 40 may generate at least one control signal based on an ID included in the current instruction PIS, and may transmit the generated control signal to a corresponding IP block of the plurality of IP blocks IP1 to IPn.

After the signal generator 40 generates the at least one control signal, the signal generator 40 may transmit the current instruction request PREQ to the buffer 20. The signal generator 40 may receive an instruction, which is to be executed next, as the current instruction PIS from the buffer 20.

The buffer 20 may receive an instruction IS from the interface 10 and may store the received instruction IS in an internal register thereof. The buffer 20 may be referred to as an instruction buffer. In an exemplary embodiment, the buffer 20 may include N (where N is an integer equal to or greater than one) number of registers, and the buffer 20 may store N instructions IS, having relatively early execution times, of a plurality of instructions IS which is received from the interface 10 at the same time or different times. The buffer 20 may compare the execution times of the N instructions IS, and may respectively store the N instructions IS in the N registers according to execution orders based on a result of the comparison.

The buffer 20 may provide the heap sorting circuit 50 with instructions IS, having relatively late execution times, of the plurality of instructions IS. The buffer 20 may provide the heap sorting circuit 50 with a write enable signal EN along with an instruction IS.

In a state in which the N instructions IS are stored in the N registers, when a new instruction IS is received from the interface 10, the buffer 20 may compare an execution time of the received instruction IS with the execution time of each of the N instructions IS, and may update the N instructions IS stored in the N registers based on a result of the comparison.

When the buffer 20 receives the current instruction request PREQ from the signal generator 40, the buffer 20 may provide an instruction, which is stored in a first register of the N registers and has an earliest execution time, as a current instruction PIS to the signal generator 40. The buffer 20 may shift one instruction each time among N−1 number of instructions stored in second to $N^{th}$ registers to store the N−1 instructions in the first to N−1$^{th}$ registers. The buffer 20 may transmit a new instruction request NREQ to the heap sorting circuit 50, and then, when an instruction IS is received from the heap sorting circuit 50, the buffer 20 may store the received instruction IS in the $N^{th}$ register.

The heap sorting circuit 50 may sort instructions IS received from the buffer 20 according to execution orders based on heap sorting using an execution time, and may store sorted instructions SIS in the memory 130.

When the new instruction request NREQ is received from the buffer 20, the heap sorting circuit 50 may read an instruction IS (e.g., an instruction IS having an earliest execution time) having a highest execution order of the sorted instructions IS stored in the memory 130, and may provide the read instructions IS to the buffer 20.

The heap sorting circuit 50 may include heap sorting logic 51 and a memory controller 52. The memory controller 52 may control the heap sorting logic 51 and the timing control memory 130 so that instructions IS received from the buffer 20 are sorted in ascending power based on an execution time, and the sorted instructions SIS are stored in the memory 130.

When the write enable signal EN and an instruction IS are received from the buffer 20, the memory controller 52 may transmit the received instruction IS and an operation mode signal OPMD representing a write operation to the heap sorting logic 51. The operation mode signal OPMD may be provided to the memory 130. Also, when a new instruction request NREQ is received from the buffer 20, the memory controller 52 may transmit the operation mode signal OPMD, which represents a read operation, to the heap sorting logic 51 and/or the memory 130. When an instruction IS having an earliest execution time is read from the memory 130 and is received by the memory controller 52, the memory controller 52 may transmit the instruction IS read from the memory 130 to the buffer 20.

In a case in which the heap sorting logic 51 stores an instruction IS in the memory 130 or reads the instruction IS from the memory 130, the heap sorting logic 51 may sort instructions IS based on heap sorting. The heap sorting logic 51 may be implemented based on the heap sorting algorithm configuring a minimum heap tree. The heap sorting logic 51 may sort the instructions IS in real time. An operation (e.g., a sorting method based on the heap sorting algorithm) of the heap sorting logic 51 will be described below with reference to FIGS. 5 to 8.

In a case in which the heap sorting logic 51 sorts a maximum of K (where K is an integer equal to or greater than two) instructions, log(K) number of clocks of a clock signal (e.g., the system clock signal SCLK) are utilized. In order for the heap sorting logic 51 to sort instructions IS in real time, the heap sorting logic 51 may operate at a speed which is log(K) or more times an operation speed of the reference counter 30.

As described above, in the timing controller 120 according to an exemplary embodiment of the present inventive concept, when an instruction is added, the heap sorting circuit 50 may sort instructions in real time according to execution orders based on heap sorting. Accordingly, a working load of the processor 110 which generates an instruction may be reduced, and a degree of availability of the processor 110 may increase.

When the reference time RT reaches an execution time of each of the instructions, the instructions may be executed. In a case in which the reference time RT is compared with the execution time of each of the instructions so as to determine whether the reference time RT reaches the execution time of each of the instructions, a number of comparators corresponding to the number of instructions may be utilized. Accordingly, the complexity of a timing controller according to a comparative example may be high, and an area thereof may be large.

However, as described above, in the timing controller 120 according to an exemplary embodiment of the present inventive concept, the signal generator 40 may compare the reference time RT with an execution time of an instruction which is to be executed earliest, and when the reference time RT reaches the execution time, the signal generator 40 may execute the instruction and may compare the reference time RT with an execution time of an instruction which is to be executed next. In this manner, the signal generator 40 may sequentially compare the reference time RT with execution times of instructions according to execution orders of the instructions, and thus, in an exemplary embodiment, only one comparator is sufficient. Therefore, the complexity and area of the timing controller 120 may be reduced. Also, instructions IS sorted by the heap sorting circuit 50 may be stored in the memory 130 instead of a large-size register, and thus, the area of the timing controller 120 may be reduced.

Figure 3:
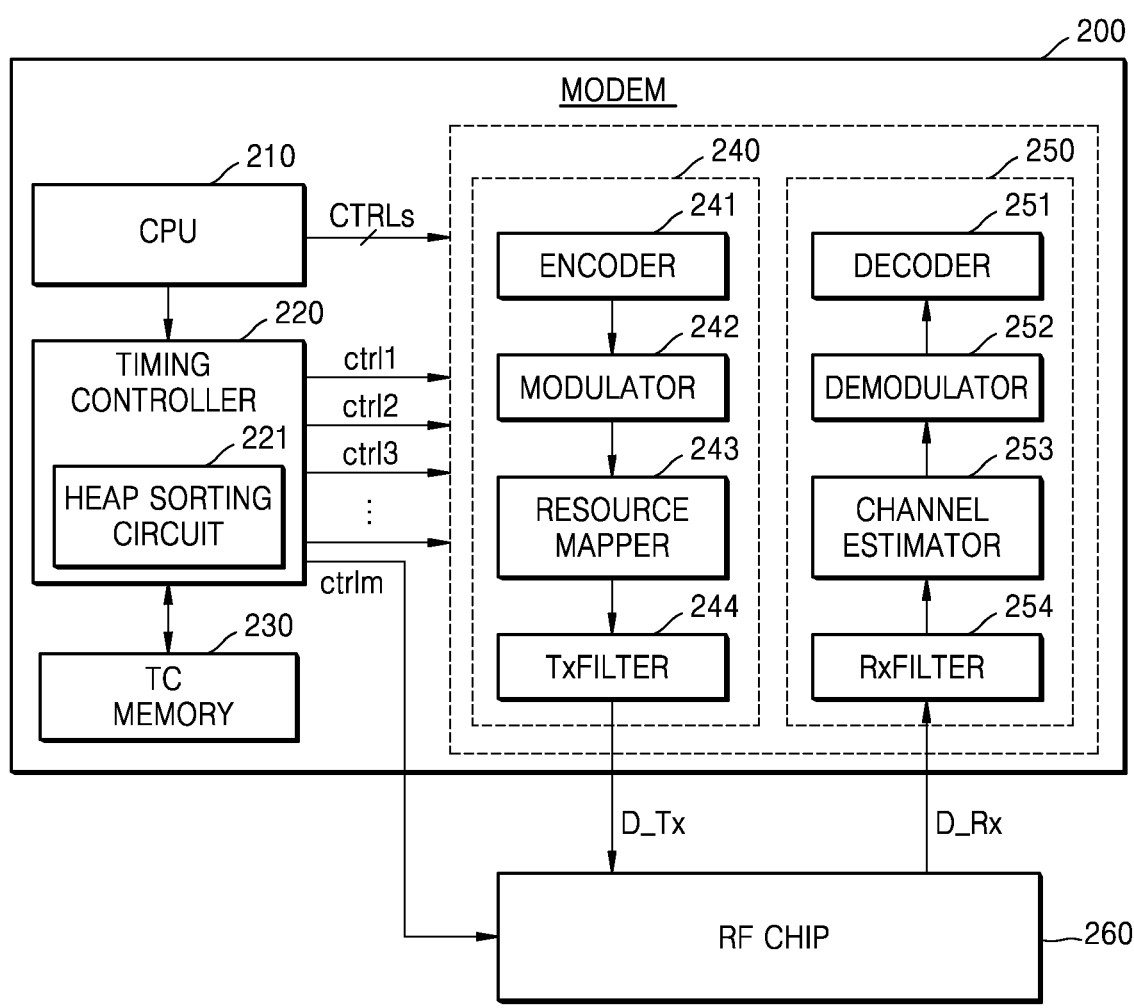
FIG. 3 is a block diagram illustrating a modem according to an exemplary embodiment of the present inventive concept.

FIG. 3 is a block diagram illustrating a modem 200 according to an exemplary embodiment of the present inventive concept.

Referring to FIG. 3, the modem 200 may include a CPU 210, a timing controller 220, a memory 230, a transmission circuit 240, and a reception circuit 250. The transmission circuit 240 may include an encoder 241, a modulator 242, a resource mapper 243, and a transmission filter 244. The reception circuit 250 may include a decoder 251, a demodulator 252, a channel estimator 253, and a reception filter 254. The timing controller 220 may include a heap sorting circuit 221. A configuration and an operation of the heap sorting circuit 221 may be the same as the configuration and operation of the heap sorting circuit 50 described above with reference to FIG. 2. Thus, for convenience of explanation, a further description thereof is omitted. In addition to the transmission circuit 240 and the reception circuit 250, the modem 200 may further include other elements. The elements of each of the transmission circuit 240 and the reception circuit 250 may be implemented with hardware or a combination of software and hardware. The modem 200 may be implemented as one block of a system on chip (SoC), or may be implemented as one semiconductor chip (for example, a modem chip).

The CPU 210 may control an overall operation of the modem 200. The CPU 210 may provide the transmission circuit 240 and the reception circuit 250 with configuration control signals CTRLs that control configurations of the elements of each of the transmission circuit 240 and the reception circuit 250. The CPU 210 may generate a plurality of instructions IS that control operation times of the elements of each of the transmission circuit 240 and the reception circuit 250, and may transmit the plurality of instructions IS to the timing controller 220. The plurality of instructions IS may be generated and transmitted at different times.

A description of the timing controller 120 given above with reference to FIG. 2 may be applied to the timing controller 220 of FIG. 3. The timing controller 220 may sort the plurality of instructions IS in real time according to execution orders of the instructions IS based on heap sorting. The sorted instructions IS may be stored in the memory 230. The sorted instructions IS may be read from the memory 230 and may be used to generate control signals (for example, first to $m^{th}$ control signals) ctrl1 to ctrlm. In the exemplary embodiment illustrated in FIG. 3, m is an integer greater than or equal to four. However, exemplary embodiments are not limited thereto. For example, in exemplary embodiments, m may be an integer greater than or equal to one. A configuration and an operation of the timing controller 220 are the same as the configuration and operation of the timing controller 120 described above with reference to FIG. 2. Thus, for convenience of explanation, a further description thereof is omitted.

The transmission circuit 240 may process a transmission signal to generate transmission data D_Tx corresponding to a baseband signal. The transmission data D_Tx output from the transmission circuit 240 may be transmitted to a radio frequency (RF) chip 260, and the RF chip 260 may convert the transmission data D_Tx into an RF transmission signal and may output the RF transmission signal to a wireless network. An RF reception signal received over the wireless network may be converted into reception data D_Rx corresponding to a baseband signal by using the RF chip 260, and the reception data D_Rx may be transmitted to the reception circuit 250. The reception circuit 250 may process the reception data D_Rx to obtain a reception signal.

The wireless network may be a cellular network such as, for example, a $3^{rd}$ generation (3G) network, a $5^{th}$ generation wireless (5G) network, a long term evolution (LTE) network, an LTE-advanced network, a code division multiple access (CDMA) network, or a global system for mobile communications (GSM) network, or a wireless network such as a wireless local area network (WLAN). However, the wireless network is not limited thereto.

The control signals ctrl1 to ctrlm generated by the timing controller 220 may be provided to the elements (for example, the encoder 241, the modulator 242, the resource mapper 243, and the transmission filter 244) of the transmission circuit 240 and the elements (for example, the decoder 251, the demodulator 252, the channel estimator 253, and the reception filter 254) of the reception circuit 250. Each of the elements of the transmission circuit 240 and the reception circuit 250 may operate at a certain time in response to a corresponding control signal. In an exemplary embodiment, at least one control signal (for example, the $m^{th}$ control signal ctrlm) generated by the timing controller 120 may be provided to the RF chip 260. The RF chip 260 may operate based on the $m^{th}$ control signal ctrlm. The RF chip 260 may operate in synchronization with the transmission circuit 240 and the reception circuit 250 of the modem 200 based on the $m^{th}$ control signal ctrlm.

Figure 4:
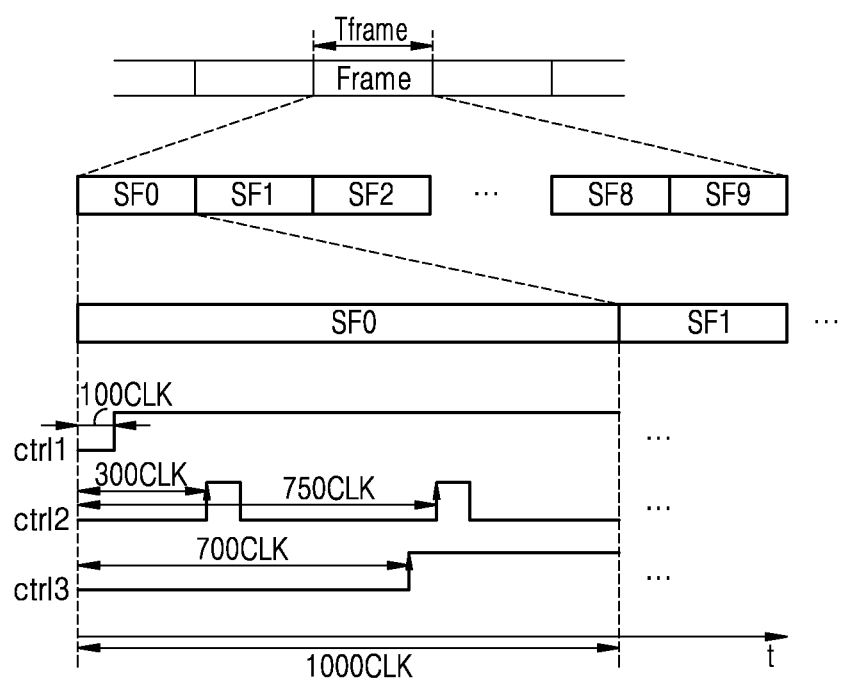
FIG. 4 is a diagram illustrating an example in which control signals are generated in a sub-frame period, and illustrating an example of a structure of a signal transmitted over a wireless network, according to an exemplary embodiment of the present inventive concept.

FIG. 4 is a diagram illustrating an example in which control signals are generated in a sub-frame period, and illustrating an example of a structure of a signal transmitted over a wireless network, according to an exemplary embodiment of the present inventive concept.

Referring to FIG. 4, a signal transmitted over the wireless network may include a plurality of frames, and one frame (referred to as a radio frame) may include a plurality of sub-frames SF0 to SF9. In FIG. 4, one frame is illustrated as including ten sub-frames SF0 to SF9. However, exemplary embodiments are not limited thereto. For example, in exemplary embodiments, the number of sub-frames may vary depending on the type of wireless network.

A plurality of control signals (for example, first to third control signals) ctrl1 to ctrl3 may be generated at different times in one period of a sub-frame. In this case, the plurality of control signals ctrl1 to ctrl3 being generated may denote that rising edges or falling edges of the plurality of control signals ctrl1 to ctrl3 are generated. Thus, levels of the plurality of control signals ctrl1 to ctrl3 are shifted or pulses of the plurality of control signals ctrl1 to ctrl3 are generated. IP blocks (for example, the elements of each of the transmission circuit 240 and the reception circuit 250 of FIG. 3) corresponding to the plurality of control signals ctrl1 to ctrl3 and the RF chip 260 may operate in response to the falling edge or rising edge and the level shift or pulse of each of the plurality of control signals ctrl1 to ctrl3.

Referring to FIGS. 2 and 4, the plurality of control signals ctrl1 to ctrl3 may be generated by a timing controller (e.g., the timing controller 120 of FIG. 2). The plurality of control signals ctrl1 to ctrl3 may be generated based on different instructions. For example, a period in which the reference counter 30 outputs a count value of 1,000 clocks as the reference time RT may be defined as one period of a sub-frame. When the reference counter 30 outputs a count value of 100 clocks, the signal generator 40 may execute an instruction having an execution time which corresponds to 100 clocks, thereby generating the first control signal ctrl1. The signal generator 40 may generate the first control signal ctrl1 having an active level (for example, a high level) at a time when the reference time RT corresponds to 100 clocks.

Similarly, when the reference counter 30 outputs a count value of 300 clocks, a count value of 700 clocks, and a count value of 750 clocks, the signal generator 40 may execute instructions having respective execution times which correspond to 100 clocks, 300 clocks, 700 clocks, and 750 clocks, thereby generating the second control signal ctrl2 and the third control signal ctrl3.

Figure 5:
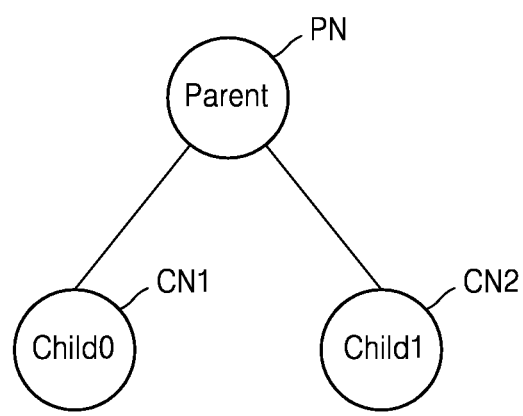
FIG. 5 is a diagram for describing heap sorting according to an exemplary embodiment of the present inventive concept.

FIG. 5 is a diagram for describing heap sorting according to an exemplary embodiment of the present inventive concept.

Referring to FIG. 5, heap sorting may be a method in which pieces of data are configured in a binary tree structure (hereinafter referred to as a heap tree structure) called a heap, and are sorted. In the heap tree structure, two lower nodes (e.g., two child nodes) CN1 and CN2 may be connected to a parent node PN, which is an upper node. For example, each of nodes may have two child nodes. The parent node PN may be compared with each of the two child nodes CN1 and CN2, and thus, a sorting state may be maintained. According to a maximum sorting method, a value (data) of the parent node PN may be greater than a value of each of the child nodes CN1 and CN2. According to a minimum sorting method, the value (data) of the parent node PN may be less than the value of each of the child nodes CN1 and CN2.

When a new value is input or a value of an uppermost node is output, a small number of arithmetic operations may be performed through a process of re-sorting only branches of a corresponding node, thereby maintaining the heap tree structure.

Figure 6B:
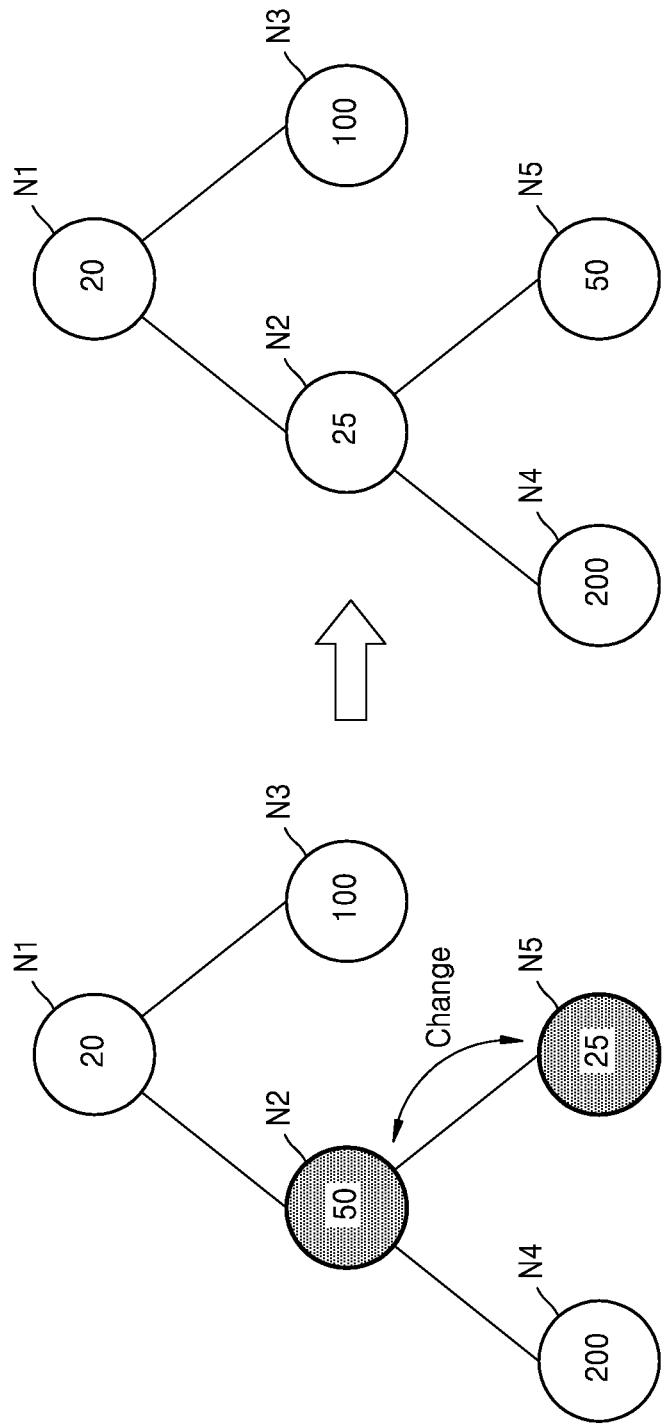

FIGS. 6A and 6B are diagrams for describing a heap sorting method according to an exemplary embodiment of the present inventive concept.

FIG. 6A illustrates instructions IS received by heap sorting logic (for example, heap sorting logic 51 of FIG. 2). FIG. 6B illustrates a method of configuring, by using heap sorting logic (for example, heap sorting logic 51 of FIG. 2), a minimum heap tree. FIGS. 6A and 6B illustrate an insertion operation in which an instruction (e.g., a value of a node) is added.

Referring to FIG. 6A, an instruction IS may include an execution time ET and an ID. Received instructions IS1 to IS5 may be sorted based on an execution time of each of the instructions IS1 to IS5.

Referring to FIGS. 6A and 6B, values of nodes (e.g., first to fifth nodes N1 to N5) of a heap tree structure may correspond to execution times ET of the instructions (for example, first to fifth instructions) IS1 to IS5. In a state in which the first to fourth instructions IS1 to IS4 are received, the execution times ET of the first to fourth instructions IS1 to IS4 may respectively correspond to values of the first to fourth nodes N1 to N4. Subsequently, when the fifth instruction IS5 is received, 25, which is the execution time ET of the fifth instruction IS5, may be connected to the second node N2 as a value of the fifth node N5. In this case, 50, which is a value of the second node N2 corresponding to a parent node, is greater than 25, which is a value of the fifth node N5 corresponding to a child node. Therefore, a value of the second node N2 and a value of the fourth node N4 may be swapped. Accordingly, the minimum heap tree may be maintained.

The first to fifth instructions IS1 to IS5 may be sorted according to execution orders thereof based on the heap sorting method illustrated in FIG. 6B. The sorted first to fifth instructions IS1 to IS5 may be stored in a memory (for example, the memory 130 of FIG. 2).

Figure 7B:
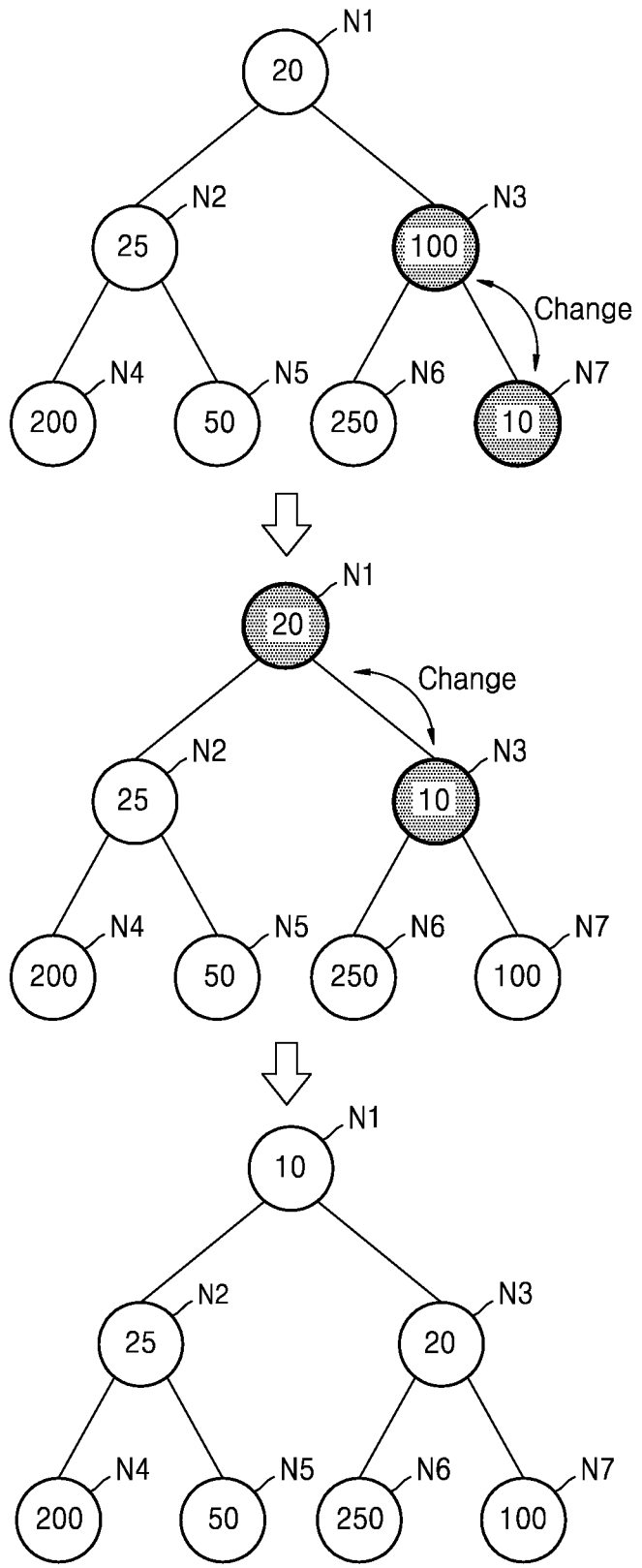

FIGS. 7A and 7B are diagrams for describing a heap sorting method according to an exemplary embodiment of the present inventive concept.

FIG. 7A illustrates instructions IS received by heap sorting logic (for example, heap sorting logic 51 of FIG. 2). FIG. 7B illustrates a method of configuring a minimum heap tree. FIGS. 7A and 7B illustrate an insertion operation in which an instruction (e.g., a value of a node) is added.

Referring to FIGS. 7A and 7B, in a state in which first to sixth instructions IS1 to IS6 are received, execution times ET of the first to sixth instructions IS1 to IS6 may respectively correspond to values of the first to sixth nodes N1 to N6. Subsequently, when a seventh instruction IS7 is received, 10, which is an execution time ET of the seventh instruction IS7, may be connected to the third node N3 as a value of a seventh node N7. In this case, 100, which is a value of the third node N3 corresponding to a parent node, is greater than 10, which is a value of the seventh node N7 corresponding to a child node. Therefore, a value of the third node N3 and a value of the seventh node N7 may be swapped.

After the value of the third node N3 and the value of the seventh node N7 are swapped, 20, which is a value of the first node N1 corresponding to a parent node, is greater than 10, which is a value of the third node N3 corresponding to a child node. Therefore, a value of the first node N1 and a value of the third node N3 may be swapped. Accordingly, the minimum heap tree may be maintained.

The first to seventh instructions IS1 to IS7 may be sorted according to execution orders thereof based on the heap sorting method illustrated in FIG. 7B. The sorted first to seventh instructions IS1 to IS7 may be stored in a memory (for example, the memory 130 of FIG. 2).

Figure 8:
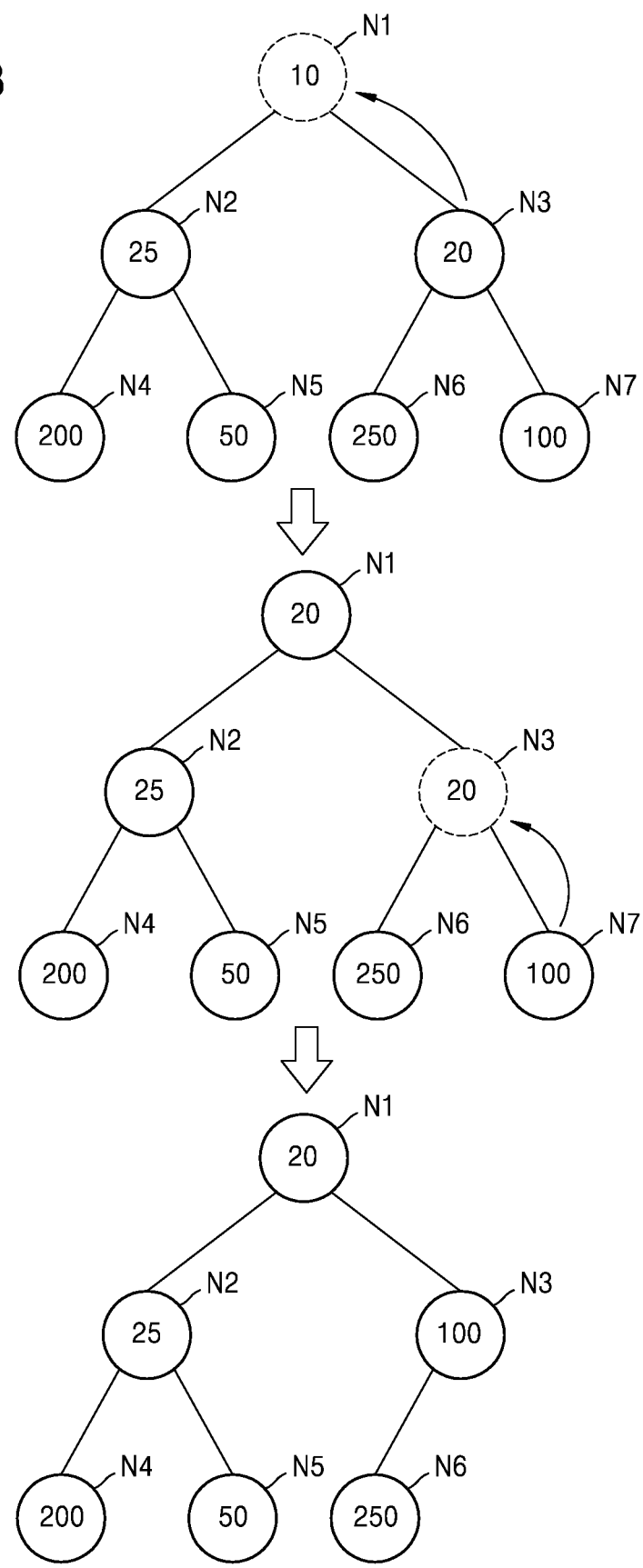
FIG. 8 is a diagram for describing a heap sorting method according to an exemplary embodiment of the present inventive concept.

FIG. 8 is a diagram for describing a heap sorting method according to an exemplary embodiment of the present inventive concept.

FIG. 8 illustrates a deletion operation in which a value of an uppermost node is deleted from a minimum heap tree structure. For example, as described above, when an instruction (e.g., an instruction corresponding to an uppermost node of a heap tree structure) having a highest execution order among instructions sorted and stored according to execution orders based on the heap sorting method is output, the uppermost node (e.g., a value of a first node N1) may be deleted.

Referring to FIG. 8, when the value of the first node N1 is deleted, the smaller value of values of second and third nodes N2 and N3 corresponding to child nodes of the first node N1 may move to the first node N1. Therefore, 20, which is the value of the third node N3, may move to the first node N1. Subsequently, the smaller value of values of sixth and seventh nodes N6 and N7 corresponding to child nodes of the third node N3 may move to the third node N3. Therefore, 100, which is the value of the seventh node N7, may move to the third node N3. Accordingly, the minimum heap tree may be maintained. Instructions respectively corresponding to nodes may be re-sorted and stored based on the minimum heap tree structure.

Figure 9A:
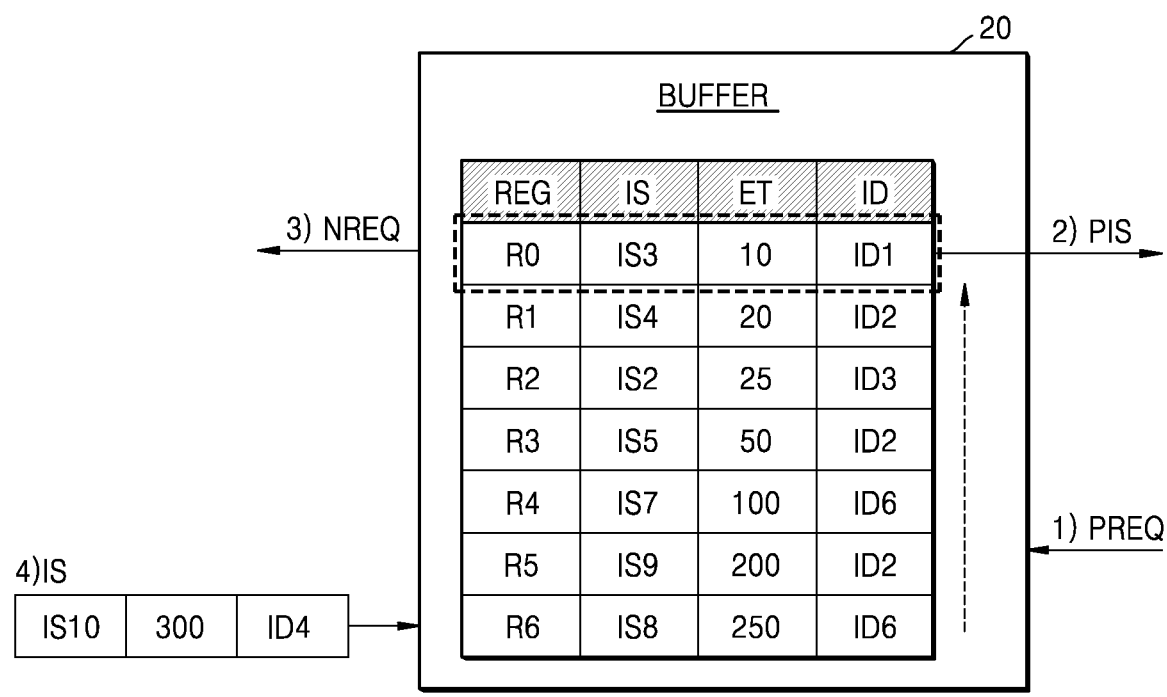
FIGS. 9A and 9B are diagrams for describing an operation of a buffer of FIG. 2 according to an exemplary embodiment of the present inventive concept.
Figure 9B:
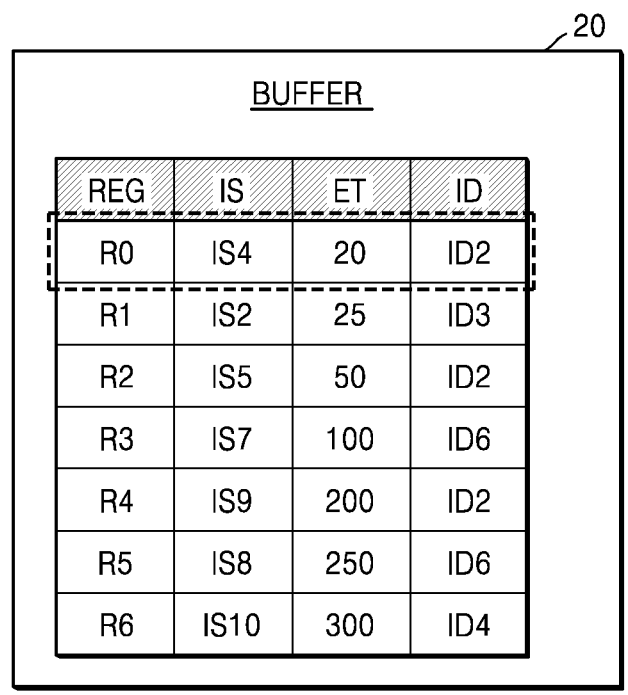

FIGS. 9A and 9B are diagrams for describing an operation of the buffer 20 of FIG. 2 according to an exemplary embodiment of the present inventive concept.

FIGS. 9A and 9B are diagrams for describing an operation of providing, by using the buffer 20 of FIG. 1, the signal generator 40 of FIG. 1 with an instruction having a highest execution order among stored instructions according to a request of the signal generator 40.

Referring to FIGS. 2 and 9A, the buffer 20 may include a plurality of registers (for example, first to seventh registers) R0 to R6. In FIG. 9A, the buffer 20 is illustrated as including seven registers. However, exemplary embodiments are not limited thereto. For example, in exemplary embodiments, the buffer 20 may include one register or two or more registers.

Seven instructions may be stored in the first to seventh registers R0 to R6. Each of the instructions may include an execution time ET and an ID. The seven instructions may be stored in the first to seventh registers R0 to R6 according to execution orders determined based on execution times ET. A third instruction IS3 having a highest execution order may be stored in the first register R0, and an eighth instruction IS8 having a lowest execution order may be stored in the seventh register R6.

When a current instruction request PREQ is received from the signal generator 40, the buffer 20 may provide an instruction (for example, the third instruction IS3 stored in the first register R0) having a highest execution order as a current instruction PIS to the signal generator 40.

When the third instruction IS3 is output, the buffer 20 may move the instructions stored in the second to seventh registers R1 to R6 to the first to sixth registers R0 to R5. Therefore, the seventh register R6 may be empty. The buffer 20 may transmit a new instruction request NREQ to the heap sorting circuit 50. In response to the new instruction request NREQ, the heap sorting circuit 50 may transmit an instruction (for example, a tenth instruction IS10) having a highest execution order among instructions stored in the memory 130. As illustrated in FIG. 9B, the buffer 20 may store the transmitted tenth instruction IS10 in the seventh register R6.

Figure 10A:
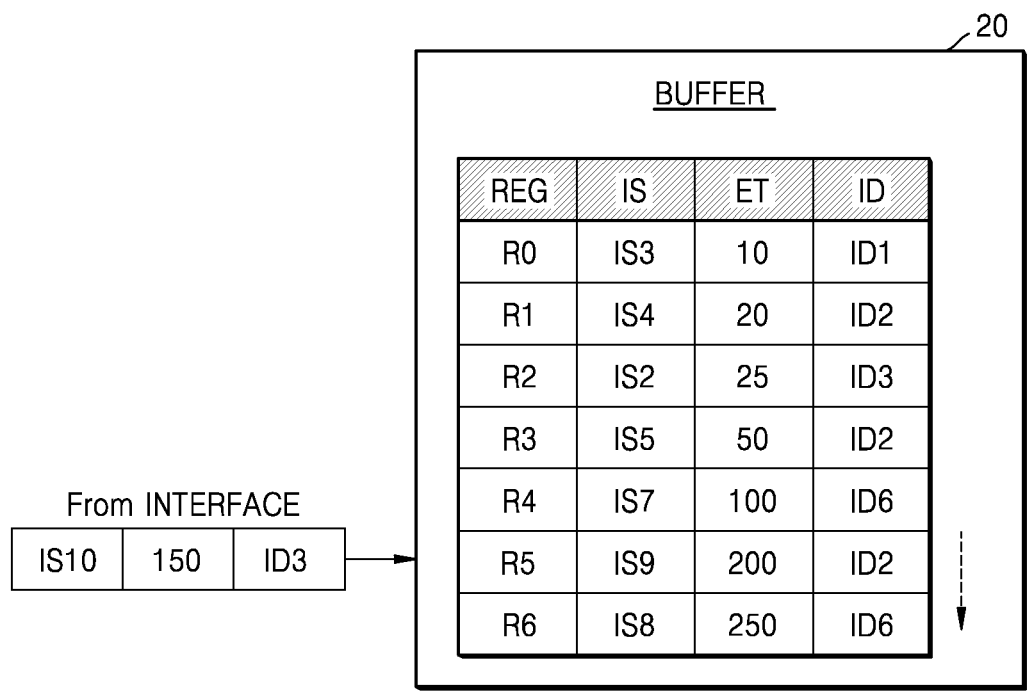
FIGS. 10A and 10B are diagrams for describing an operation of a buffer of FIG. 2 according to an exemplary embodiment of the present inventive concept.
Figure 10B:
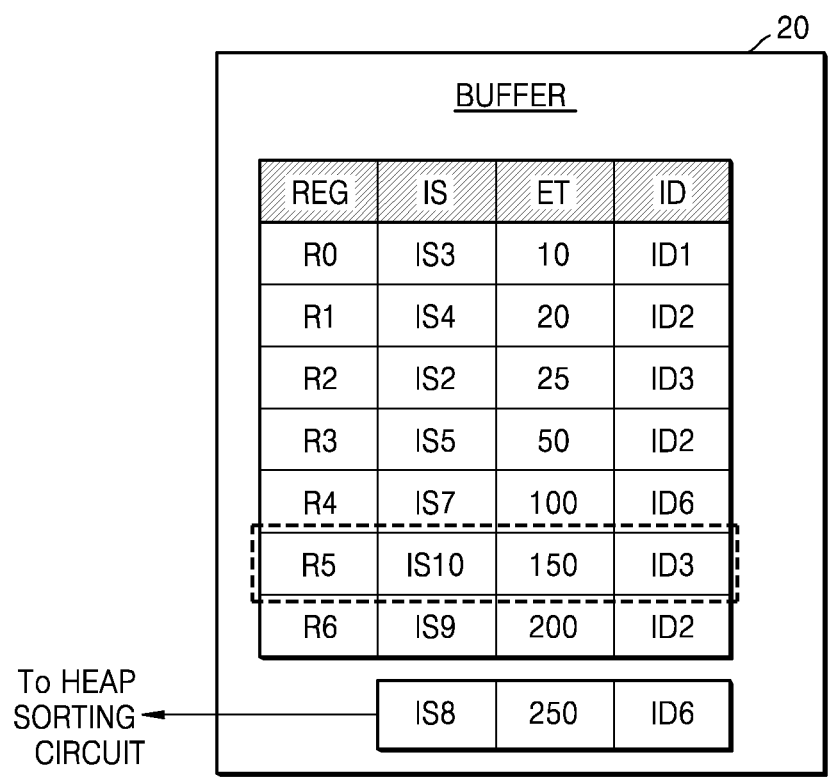

FIGS. 10A and 10B are diagrams for describing an operation of the buffer 20 of FIG. 2 according to an exemplary embodiment of the present inventive concept.

For example, FIGS. 10A and 10B are diagrams for describing an operation of receiving, by using the buffer 20 of FIG. 2, a new instruction from the interface 10 of FIG. 2.

Referring to FIGS. 2 and 10A, seven instructions may be stored in first to seventh registers R0 to R6 of the buffer 20 according to execution orders. When a new instruction (for example, a tenth instruction IS10) is received from the interface 10, the buffer 20 may compare an execution time ET of the tenth instruction IS10 with each of execution times ET of the stored seven instructions. The execution time ET of the tenth instruction IS10 may be 150, which is earlier than 200, which is an execution time ET of a ninth instruction IS9 stored in the sixth register R5. Therefore, as illustrated in FIG. 10B, the buffer 20 may store the ninth instruction IS9 stored in the sixth register R5 in the seventh register R6, and may store the tenth instruction IS10 in the sixth register R5. After this process, as shown in FIG. 10B, an eighth instruction IS8 previously stored in the seventh register R6 is not stored in the buffer 20. Therefore, the buffer 20 may transmit a write enable signal EN and the eighth instruction IS8 to the heap sorting circuit 50. The heap sorting circuit 50 may re-sort instructions pre-stored in the memory 130 and the transmitted eighth instruction IS8 based on heap sorting, and may store sorted instructions SIS in the memory 130.

Figure 11:
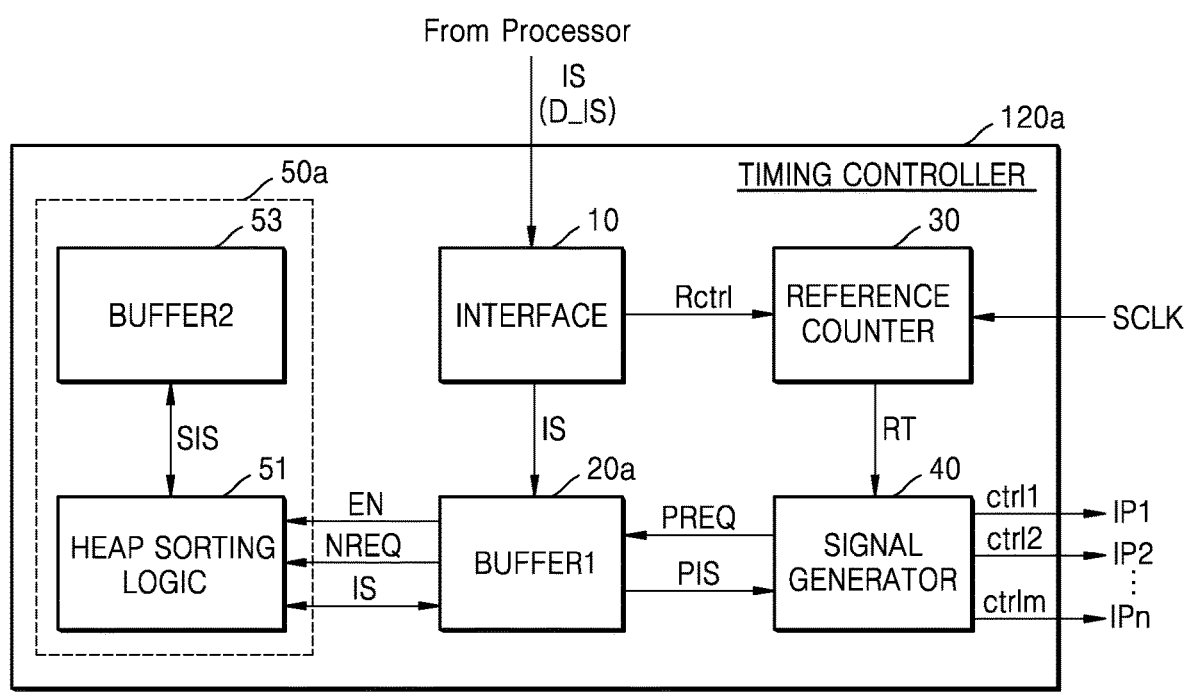
FIG. 11 is a block diagram illustrating a timing controller according to an exemplary embodiment of the present inventive concept.

FIG. 11 is a block diagram illustrating a timing controller 120a according to an exemplary embodiment of the present inventive concept.

Referring to FIG. 11, the timing controller 120a may include an interface 10, a reference counter 30, a first buffer 20a, a signal generator 40, and a heap sorting circuit 50a. Operations of the interface 10, the reference counter 30, the first buffer 20a, and the signal generator 40 of FIG. 11 are the same as those of the interface 10, the reference counter 30, the buffer 20, and the signal generator 40 of FIG. 2. Thus, for convenience of explanation, a further description thereof is omitted.

In the exemplary embodiment illustrated in FIG. 11, the heap sorting circuit 50a may include heap sorting logic 51 and a second buffer 53. The second buffer 53 may include more registers than the first buffer 20a. The heap sorting circuit 50a may sort instructions IS received from the first buffer 20a according to execution orders based on heap sorting, and may store sorted instructions SIS in the second buffer 53.

Figure 12:
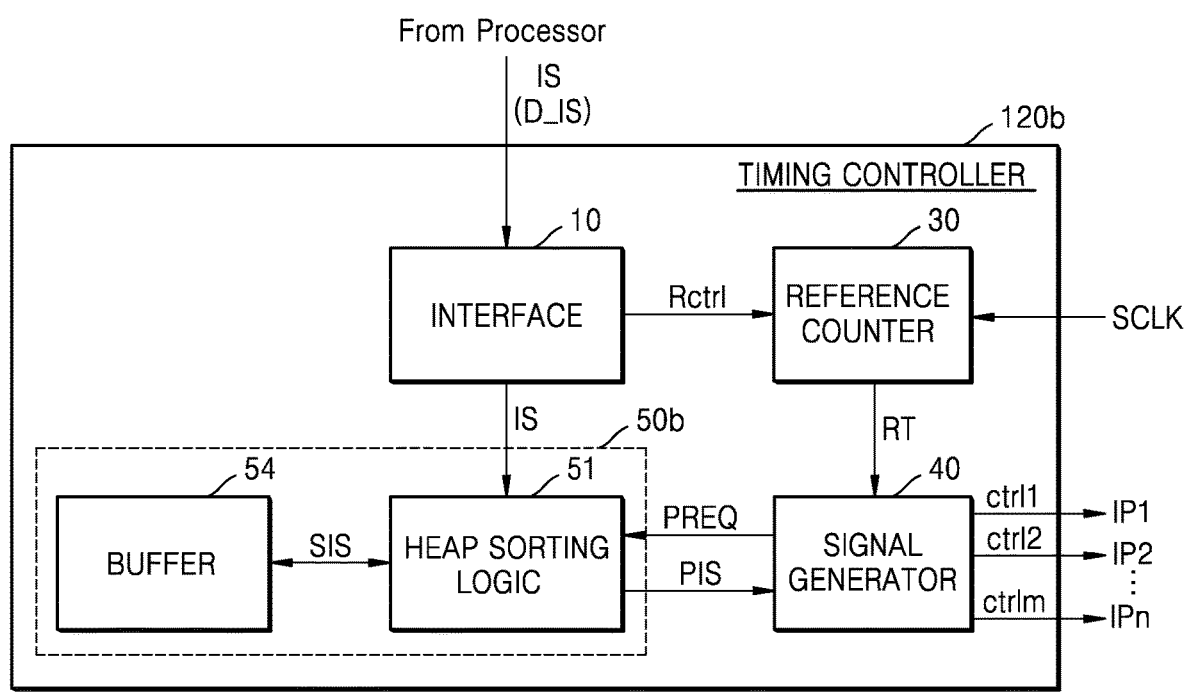
FIG. 12 is a block diagram illustrating a timing controller according to an exemplary embodiment of the present inventive concept.

FIG. 12 is a block diagram illustrating a timing controller 120b according to an exemplary embodiment of the present inventive concept.

Referring to FIG. 12, the timing controller 120b may include an interface 10, a reference counter 30, a signal generator 40, and a heap sorting circuit 50b. Operations of the interface 10, the reference counter 30, and the signal generator 40 of FIG. 12 are the same as those of the interface 10, the reference counter 30, and the signal generator 40 of FIG. 2. Thus, for convenience of explanation, a further description thereof is omitted.

In the exemplary embodiment of FIG. 12, the heap sorting circuit 50b may include heap sorting logic 51 and a buffer 54. The buffer 54 may include a plurality of registers. The heap sorting circuit 50b may sort instructions IS received from the interface 10 according to execution orders based on heap sorting, and may store sorted instructions SIS in the buffer 54. When a current instruction request PREQ is received from the signal generator 40, the heap sorting logic 51 may provide an instruction (for example, an instruction corresponding to an uppermost node in a minimum heap tree structure) having a highest execution order among instructions stored in the buffer 54 as a current instruction PIS to the signal generator 40. The heap sorting logic 51 may re-sort the other instructions stored in the buffer 54 based on the heap sorting method described above with reference to FIG. 8, and may store sorted instructions SIS in the buffer 54.

Figure 13:
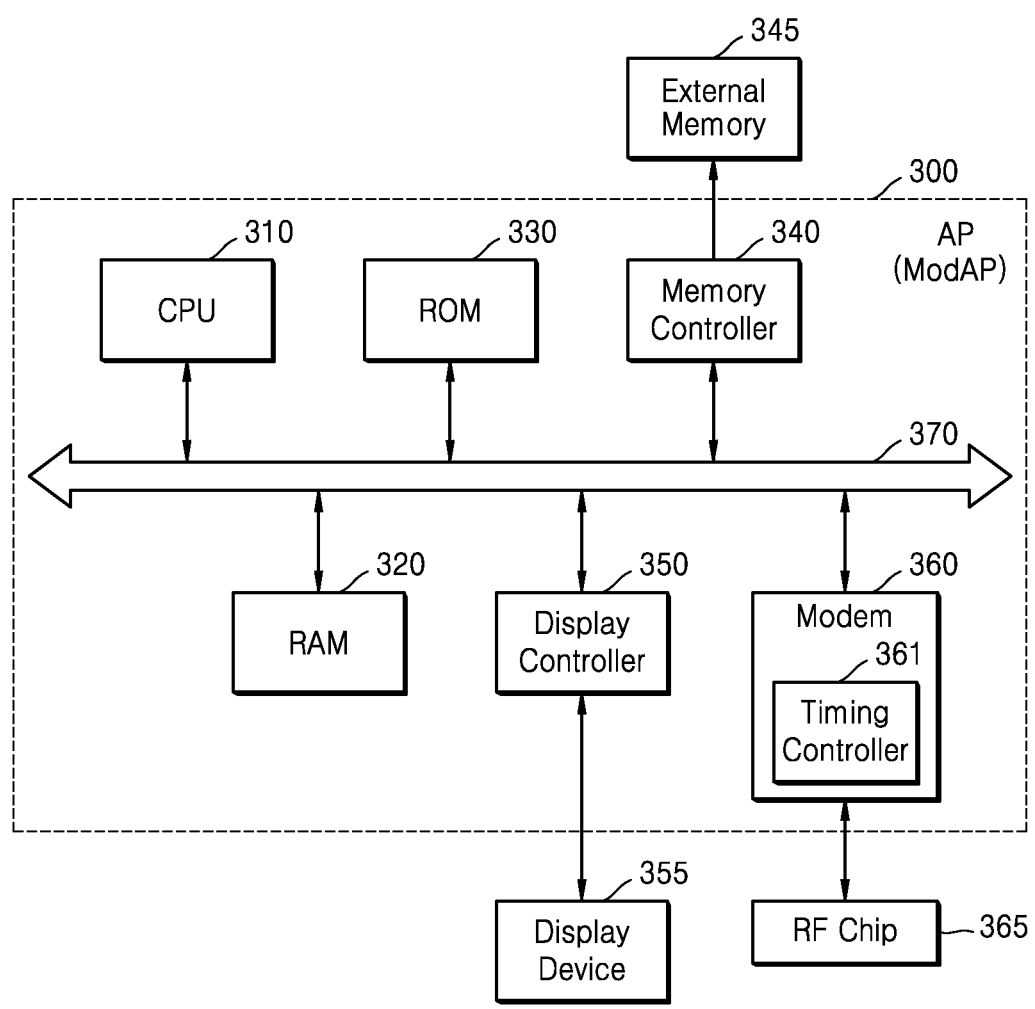
FIG. 13 is a block diagram illustrating an implementation example of an application processor into which functions performed by a modem according to an exemplary embodiment of the present inventive concept are integrated.

FIG. 13 is a block diagram illustrating an implementation example of an application processor into which functions performed by a modem according to an exemplary embodiment of the present inventive concept are integrated. A function of a modem may be integrated into the application processor of FIG. 13, and thus, the application processor of FIG. 13 may be referred to as ModAP.

Referring to FIG. 13, an application processor 300 may be implemented as an SoC and may include a CPU 310, a RAM 320, a read-only memory (ROM) 330, a memory controller 340, a display controller 350, and a modem 360. The modem 360 may include a timing controller 361 which operates based on an absolute time.

The CPU 310 may process or execute programs and/or data stored in the ROM 330 and/or the RAM 320. According to an exemplary embodiment, the CPU 310 may execute the programs stored in the ROM 330 and/or the RAM 320 to control a function of the modem 360. The ROM 330 may non-volatilely store the programs and/or the data and may be implemented as, for example, an erasable programmable read-only memory (EPROM) or an electrically erasable programmable read-only memory (EEPROM). The RAM 320 may be implemented as, for example, a memory such as a DRAM or an SRAM.

The memory controller 340 may access an external memory 345, and based on a data access request, the memory controller 340 may control the external memory 345 to write or read data. The display controller 350 may provide image data to a display device 355 and may control an image display operation of the display device 355.

The modem 360 may transmit transmission data to an external RF chip 365 and may receive reception data from the external RF chip 365. The modem 360 may include a timing controller 361 which operates based on an absolute time. The timing controller 361 may sort received instructions in real time based on heap sorting. The timing controller 361 may store sorted instructions in a memory, and to execute the instructions, the timing controller 361 may sequentially compare a reference time with instructions in descending execution order. Accordingly, the hardware complexity and area of each of the timing controller 361 and the modem 360 may be reduced.

All elements (for example, the ModAP 300, the external memory 345, the display device 355, and the external RF chip 365 illustrated in FIG. 13 may correspond to an implementation example of a communication system. The communication system may correspond to various terminals, and a communication system according to an exemplary embodiment may include the ModAP 300 and a plurality of elements connected to the ModAP 300.

While the present inventive concept has been particularly shown and described with reference to exemplary embodiments thereof, it will be understood that various changes in form and detail may be made therein without departing from the spirit and scope of the present inventive concept as defined by the following claims.

What is claimed is:

1. A modem chip, comprising:
   a processor configured to generate instructions comprising different execution times;
   a timing controller configured to receive the instructions and respectively generate control signals corresponding to the instructions at the execution times of the instructions; and
   a plurality of intellectual property (IP) blocks, wherein each IP block is configured to operate in response to a corresponding control signal of the control signals, wherein the timing controller comprises:

an instruction buffer having a first number of registers and configured to store the instructions;

a heap sorting circuit comprising:

a sorted instruction buffer having a second number of registers greater than the first number of registers included in the instruction buffer; and a heap sorting logic configured to retrieve the instructions from the instruction buffer, sort the instructions according to execution orders of the instructions based on heap sorting using the execution times, and store the sorted instructions in the sorted instruction buffer;

a reference counter configured to generate a reference time by counting a clock signal; and a signal generator comprising only one comparator configured to sequentially compare the reference time with the execution times of the instructions according to the execution orders of the instructions, and generate a control signal corresponding to a current instruction having a highest execution order among the instructions when the reference time matches the execution time of the current instruction.

2. The modem chip of claim 1, wherein the timing controller is configured to receive the instructions at different times, and when a new instruction is received, the heap sorting circuit is configured to sort pre-sorted instructions and the received instructions in real time based on the heap sorting.

3. The modem chip of claim 1, wherein the heap sorting circuit is configured to generate a minimum heap tree based on the execution time of each of the instructions.

4. The modem chip of claim 1, further comprising:

a memory that stores the instructions sorted according to the execution orders.

5. The modem chip of claim 1, wherein the instruction buffer is configured to store N instructions having a relatively early execution time of the instructions in N registers according to an execution order determined based on an execution time, and provide the heap sorting circuit with instructions having a relatively late execution time among the instructions, wherein N is an integer equal to or greater than one.

6. The modem chip of claim 5, wherein the instruction buffer is configured to output a first instruction having a highest execution order of the N instructions as the current instruction to the signal generator.

7. The modem chip of claim 6, wherein, when the first instruction is output to the signal generator, the instruction buffer is configured to receive an instruction having a highest execution order of the instructions sorted based on the heap sorting from the heap sorting circuit, and to store the received instruction.

8. The modem chip of claim 5, wherein, when a new instruction is received from the processor, the instruction buffer is configured to compare an execution time of the new instruction with an execution time of each of the N instructions, and based on a result of the comparison, the instruction buffer is configured to update the N instructions stored in the N registers and provide the heap sorting circuit with an instruction having a latest execution time.

9. The modem chip of claim 1, wherein the heap sorting circuit is configured to sort a maximum of K instructions, and an operation speed of the heap sorting circuit is log(K) or more times an operation speed of the reference counter, wherein K is an integer equal to or greater than two.

10. The modem chip of claim 1, wherein the reference counter is configured to generate the reference time at a sub-frame by counting the clock signal in a sub-frame period.

11. The modem chip of claim 10, wherein the execution time of each of the instructions is an absolute time with respect to a start time of a corresponding sub-frame.

12. The modem chip of claim 1, wherein each of the plurality of IP blocks is a hardware block comprising a transmission circuit or a reception circuit.

13. An integrated circuit, comprising:

a processor configured to output a plurality of instructions at different times, wherein each instruction comprises an execution time;

a timing controller comprising an instruction buffer having a first number of registers, a heap sorting circuit, and a signal generator, wherein the instruction buffer is configured to store the instructions, wherein the heap sorting circuit comprises a sorted instruction buffer having a second number of registers greater than the first number of registers included in the instruction buffer, and a heap sorting logic configured to retrieve the instructions from the instruction buffer, sort the instructions retrieved from the instruction buffer at different times in an order from an earliest execution time to a latest execution time, and store the sorted instructions in the sorted instruction buffer, wherein the signal generator comprises only one comparator configured to sequentially compare a reference time with the execution time of each of the instructions according to execution orders of the instructions, and generate at least one control signal corresponding to an instruction having an earliest execution time among the instructions when the reference time matches an execution time of the instruction having the earliest execution time; and a plurality of function blocks, wherein each function block is configured to operate in response to a corresponding control signal of the at least one control signal generated by the timing controller.

14. The integrated circuit of claim 13, wherein the instruction buffer is configured to store N instructions having a relatively early execution time of the plurality of instructions according to execution orders, and provide other instructions to the heap sorting circuit, wherein N is an integer equal to or greater than one, wherein the timing controller further comprises a reference counter configured to generate a count value at a faster speed than an operation speed of the integrated circuit based on counting a system clock signal, and output the count value as the reference time.

15. The integrated circuit of claim 13, wherein the heap sorting circuit is configured to generate a minimum heap tree based on the execution time of each of the plurality of instructions.

16. The integrated circuit of claim 13, wherein the heap sorting circuit comprises: the heap sorting logic configured to sort the plurality of instructions using a heap sorting algorithm; and a memory controller configured to store the plurality of instructions in a memory by controlling the heap sorting logic and the memory.

17. An application processor comprising the integrated circuit of claim 13.

18. A timing controller, comprising:
an interface circuit configured to sequentially receive a plurality of instructions from a processor, wherein each instruction comprises an execution time;
an instruction buffer having a first number of registers and configured to store one or more instructions having a relatively early execution time of the plurality of instructions, and to provide one or more instructions having a relatively late execution time of the plurality of instructions to a heap sorting logic of a heap sorting circuit;
the heap sorting circuit comprising:
a sorted instruction buffer having a second number of registers greater than the first number of registers included in the instruction buffer; and
the heap sorting logic configured to retrieve the one or more instructions having the relatively late execution time, sort the one or more instructions having the relatively late execution time according to execution orders based on heap sorting using the execution time, and store the sorted instructions in the sorted instruction buffer;
a reference counter configured to generate a reference time by counting a clock signal; and
a signal generator configured to receive an instruction having an earliest execution time of the one or more instructions having the relatively early execution time as a current instruction from the instruction buffer, and when the reference time reaches an execution time of the current instruction, generate a control signal representing an operation time of a function block corresponding to the current instruction.

19. The timing controller of claim 18, wherein,
when a new instruction is received through the interface circuit, the instruction buffer is configured to provide the heap sorting circuit with an instruction having a latest execution time of the new instruction and the one or more instructions having the relatively early execution time, and
the heap sorting circuit is configured to re-sort and store the instruction and pre-stored instructions.

20. The timing controller of claim 18, wherein the interface circuit is configured to receive the plurality of instructions through a bus from the processor.

* * * * *